(No Model.) 3 Sheets—Sheet 2.
W. T. SMITH.
CUTTING TOOL HOLDER.
No. 590,341. Patented Sept. 21, 1897.
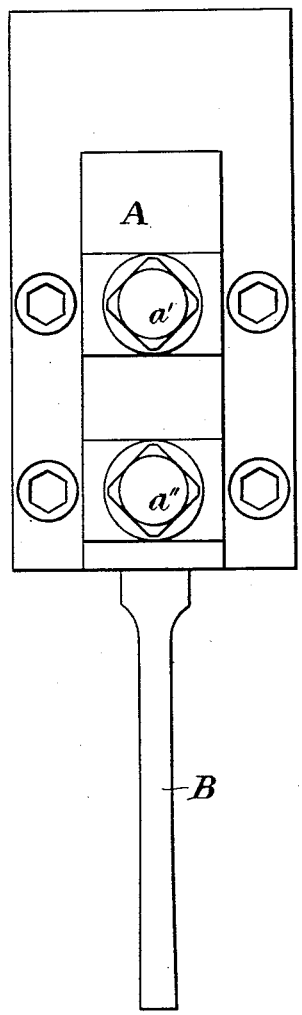
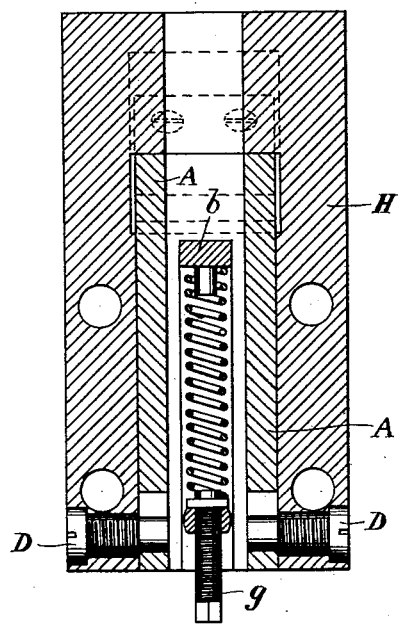
Witnesses
A. D. Harrison.
P. W. Pezzetti.
Inventor
W. T. Smith
by Wright Brown Quimby
Attorneys (No Model.) 3 Sheets—Sheet 3.
W. T. SMITH.
CUTTING TOOL HOLDER.
No. 590,341. Patented Sept. 21, 1897.
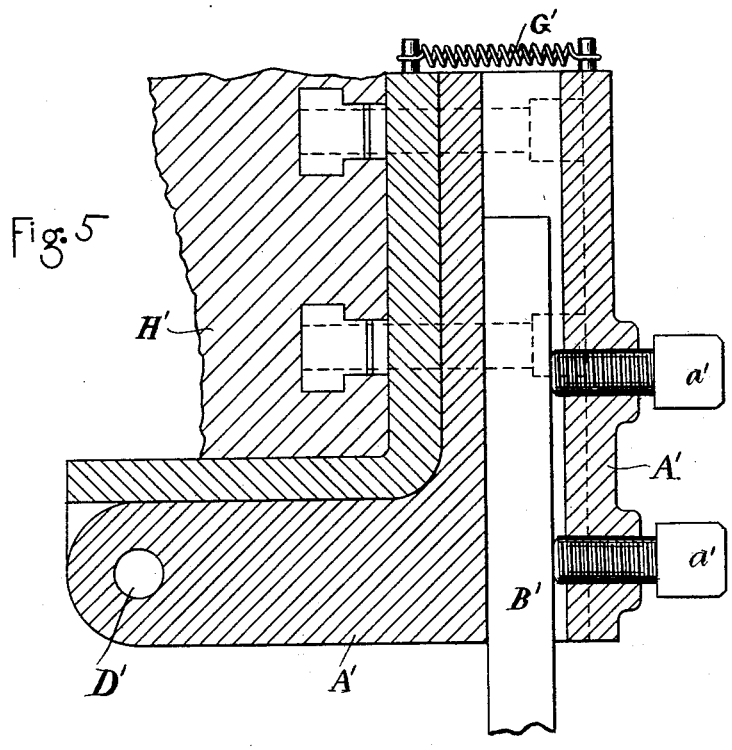
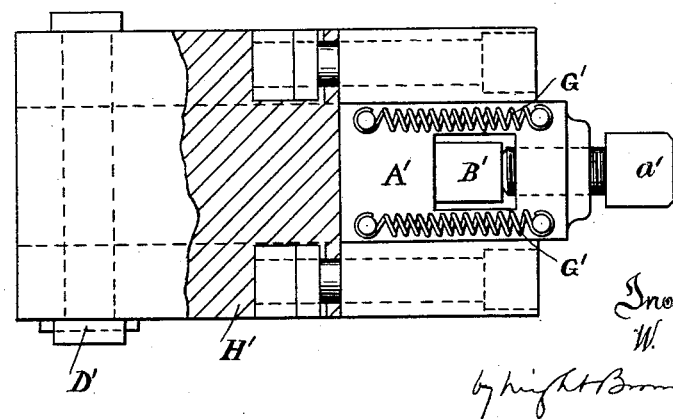
Witnesses
A. D. Harrison.
P. W. Pezzetti.
Inventor
W. T. Smith
by Wright, Brown & Quinby
Attorneys

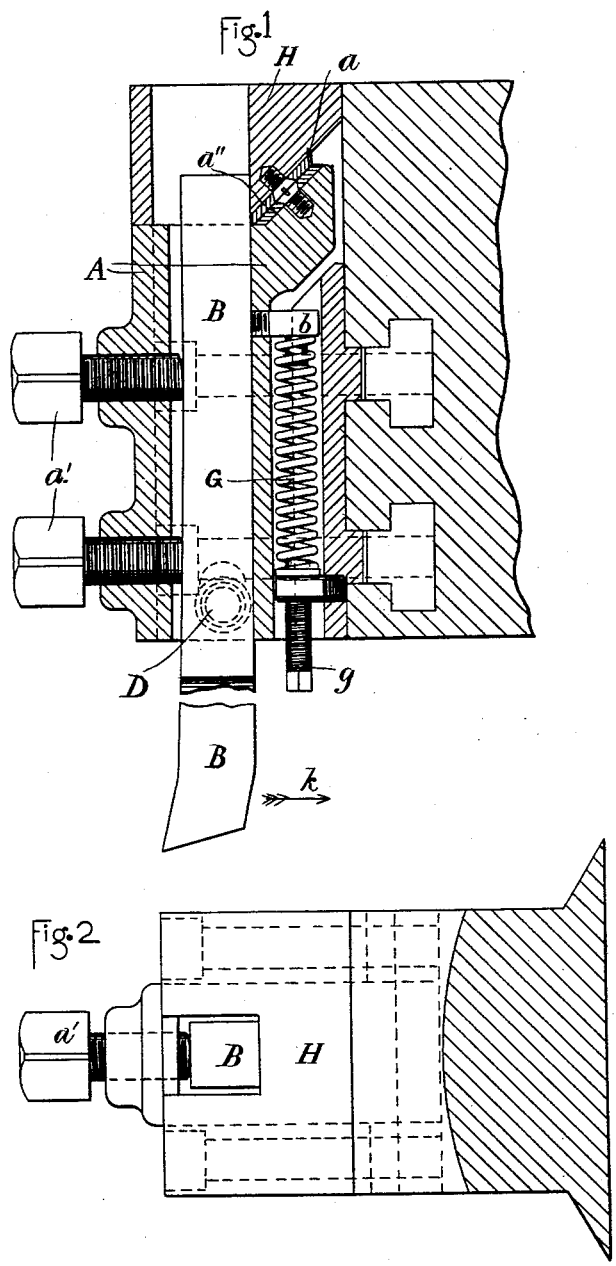

UNITED STATES PATENT OFFICE.

WILLIAM THOMAS SMITH, OF BOLTON, ENGLAND.

CUTTING-TOOL HOLDER.

SPECIFICATION forming part of Letters Patent No. 590,341, dated September 21, 1897.

Application filed November 27, 1896. Serial No. 613,677. (No model.) Patented in England March 4, 1895, No. 4,611.

*To all whom it may concern:*

Be it known that I, WILLIAM THOMAS SMITH, a subject of the Queen of Great Britain, residing at Bolton, in the county of Lancaster, England, have invented a new and Improved Cutting-Tool Holder, (for which I have obtained Letters Patent in England bearing date of March 4, 1895, and numbered 4,611,) of which the following is a specification.

In machines known as "slotting-machines," which are used for cutting metal, it is well known that when the cutting-tool, as is mostly the case, is secured and held rigidly to the operating-head, which is caused to move backward and forward or to reciprocate in one and the same undeviating path irrespective of the difference in the requirements or conditions under which its said cutting-tool acts when passing through its effective as compared with its return or ineffective movements. On this said return or ineffective motion more damage is done to the cutting edge of the tool by reason of its being so firmly pressed into contact with the article undergoing the cutting operations as to cause said cutting edge to break away or otherwise be considerably damaged than is produced by the actual cutting operations. To obviate these disadvantages and produce a tool-holder that will yield during its return or ineffective stroke and so leave the cutting edge intact is the object of this invention; and this object I attain by the novel construction of parts in combination, as hereinafter described, and as illustrated by the accompanying sheets of drawings, in which—

Figure 1 is a sectional side elevation of a tool-holder, showing the position of the tool therein. Fig. 2 is a view of same as seen from above. Fig. 3 is a front elevation of parts shown by Figs 1 and 2. Fig. 4 is a front sectional elevation also of parts shown by the other figures. Figs. 5 and 6 are similar views to Figs. 1 and 2, respectively, but are illustrative of a modification hereinafter explained.

Similar letters of reference indicate similar parts throughout the several views.

The holder A, in which the cutter B is clamped by the screws $a'$, is held in a normal position by the spring G, resting upon the adjusting-screw $g$ and pressing against the projecting piece $b$, secured to said holder A, the said normal position being such as to cause the upper inclined end $a''$ of the holder A to press against a correspondingly-inclined part $a$ of the ram H. The faces of the said inclined parts $a$ and $a''$ are preferably protected against wear by steel plates being secured to them, as shown by Fig. 1.

Reciprocatory motion is imparted in the usual and well-known manner to the ram H, and during its descending movement the cutting-tool B is firmly and securely held by it against the resistance of any material it may be acting upon, while on its ascent or upstroke, as the tool B comes in contact with the metal or material undergoing the cutting operations, said ram H is allowed to proceed, but the tool B and its holder A are retarded, and so the inclined face $a$ slides upon the inclined face $a''$, against which it is pressed by the tool B being forced or pressed in the direction indicated by the arrow $k$. Thus by the pivotal pins or screws D, on which the holder A is mounted, this said holder A and tool B are allowed to yield as desired, such yielding movement being effected by the upper end of the holder A moving as far forward as the inclined surfaces $a$ $a''$ will allow. An elongated opening or slot is made on each side the holder A for the screws D to pass through in order to permit the said holder A to move upon the face of the ram H. As the said ram H is approaching the top of its upward stroke and when the tool B has been raised clear of its work the spring G forces the holder A and tool B back into their normal positions, in which they are held during the down or cutting stroke.

A regulating-screw $g$ is provided for adjusting the tension of the spring G.

In a modified arrangement the holder A' (see Figs. 5 and 6) is pivotally mounted on the pin D', which is situated considerably out of the line or path in which the tool B' moves, so that on the downward motion of the ram H' the tool B', coming into contact with the article to be cut, causes the holder A' to press against the ram H', while on the upstroke of said ram H' the tool B, pressing against the article undergoing the cutting operations, causes the holder A' to swivel or oscillate upon its pin D' to the extent to which the tool B is forced out of its downward path, the springs G', secured at one end to the ram H' and at the other to the holder A', effecting the return of the said holder A' into its normal position, as does the spring G in the arrangement first before described.

Such being the nature and object of my invention, what I claim is—

1. A cutting-tool holder having an inclined part, a ram upon which said holder is mounted and having a correspondingly-inclined part, a spring for securing the normal operative position of the holder on the ram, a tool for use in said holder and means for securing said tool in position thereon substantially as set forth.

2. A cutting-tool holder having an inclined part, a steel plate for protecting said part to which it is attached, a ram upon which said holder is mounted and having a correspondingly-inclined part to that on the holder, a steel plate for protecting said inclined part on the ram, a spring for securing the normal operative position of the holder, a tool for use in said holder and means for securing said tool in position thereon substantially as set forth.

WILLIAM THOMAS SMITH.

Witnesses:
SAMUEL HEY,
JOHN WHITEHEAD.